Figure 1:
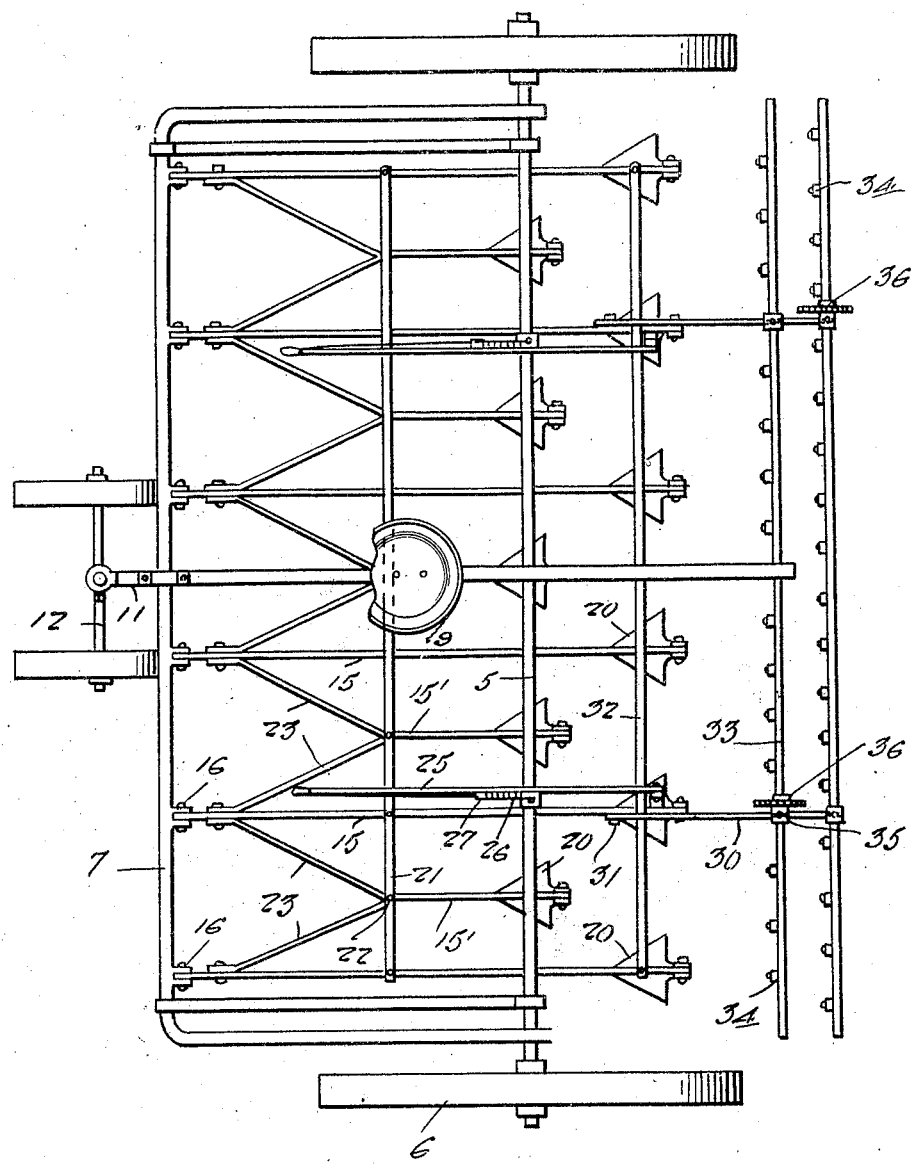

Feb. 12, 1929.

A. C. KORITZ 1,701,572

WHEELED CULTIVATOR

Filed March 15, 1928     2 Sheets-Sheet 1

Inventor
A. C. Koritz
By Clarence A. O'Brien
Attorney

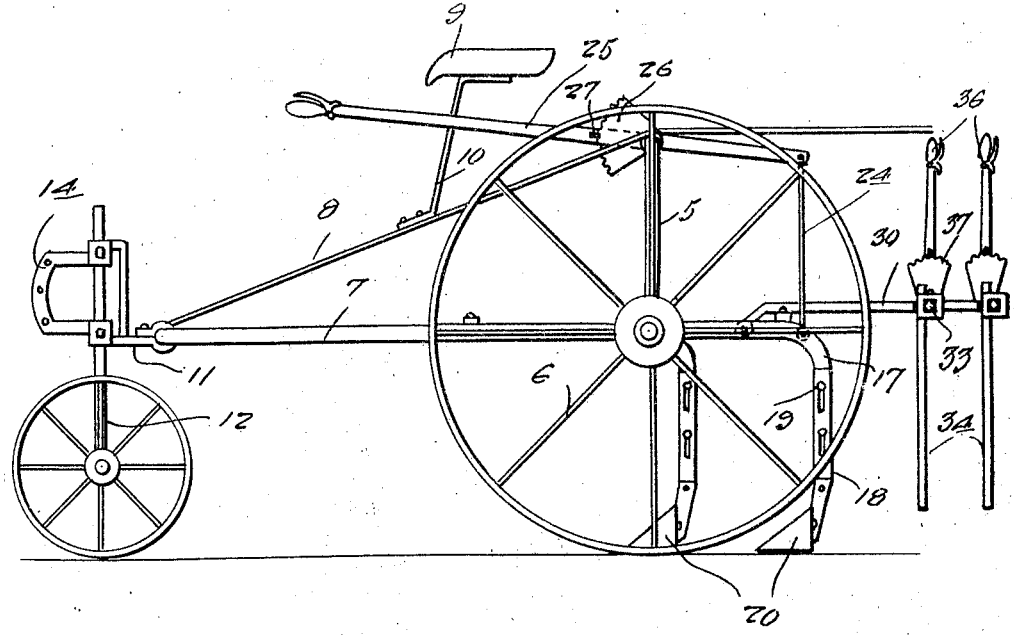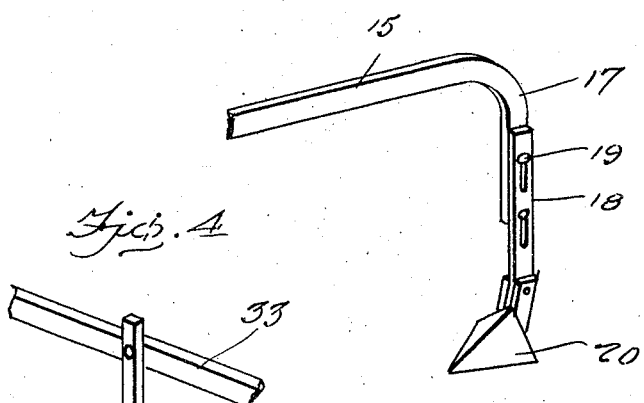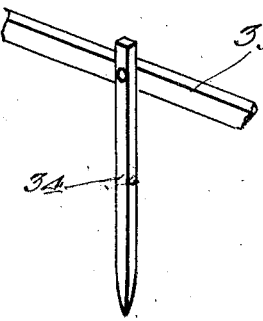

Patented Feb. 12, 1929.

1,701,572

UNITED STATES PATENT OFFICE.

AMOS C. KORITZ, OF THAWVILLE, ILLINOIS.

WHEELED CULTIVATOR.

Application filed March 15, 1928. Serial No. 261,872.

The present invention relates to a wheeled cultivator and has for its prime object to provide an improved frame structure for mounting cultivating and harrow implements in an adjustable manner.

Another very important object of the invention resides in the provision of an apparatus of this nature which is simple in its construction, strong and durable, inexpensive to manufacture, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the apparatus embodying the features of my invention, Figure 2 is an elevational view thereof, Figure 3 is a fragmentary perspective view of one of the cultivator beams with a shovel and shank attached thereto, and Figure 4 is a fragmentary perspective view of one of the rake bars showing one of the harrow teeth attached thereto.

Referring to the drawing in detail it will be seen that the numeral 5 denotes an arch on the ends of which are journaled wheels 6. A U-shaped frame member 7 has its ends secured rigidly in any suitable manner to the ends of the arch 5 and projects forwardly therefrom. A brace 8 is secured to the center of the bight portion of the spring member 7 and inclines upwardly and rearwardly and is fixed to the center of the top cross bar of the arch 5 and extends rearwardly therefrom.

A seat 9 is mounted on a support 10 which support is fixed to an intermediate portion of the inclined part of the brace 8. An arm 11 projects forwardly from the center of the bight of the frame member 7 and has dirigibly mounted therein a forward wheeled truck structure 12 which has suitable means 14 associated therefrom which may be hitched the draft such as a tractor, horses or the like.

A plurality of beams 15 are hingedly connected as at 16 with the bight portion of the frame member 7 and extend rearwardly and have their rear ends curved downwardly as at 17. Shanks 18 are adjustably connected with the ends 17 by pin and slot connections 19 for suitable adjustment and spear pointed shovels 20 are attached to the lower end of the shanks 18. A bar 21 is extended transversely of the apparatus being attached to intermediate portions of the beams 15. A plurality of beams 15′ are attached to the cross bar 21 as at 22 one between each pair of beams 15.

These beams 15′ are similarly constructed to the beams 15 except that they are much shorter and the spear point plows 20 which are engaged therewith are disposed forwardly of the first mentioned spear point shovels. Braces 23 are engaged with the bars 21 at the point 22 and diverge forwardly to be engaged with the forward end portions of the beams 15 as is clearly indicated in Figure 1. Thus the strong and rigid frame structure is provided. Links 24 are engaged with the rear end portions of two of the beams 15 adjacent the sides of the apparatus and levers 25 are rockable on the top cross bar of the arch 5 and engaged with the link 24 for raising and lowering the shovels 20 as a unit.

Notched quadrants 26 are mounted on the arch and dogs 27 are mounted on the levers 25 for engagement therewith so that the shovels 20 may be held in different adjusted positions. From the last mentioned beams 5 there extends rearwardly arms 30 which are pivotally engaged with said beams as at 31 and extend over the top of a cross bar 32 which is attached to the rear end of the beams 15.

A pair of transversely extending spaced parallel beams 33 are mounted on the arms 30 adjacent their rear ends. A plurality of harrow teeth 34 are fixed to these beams 33 and depend downwardly therefrom. The beams 33 are rockable on the arms 30 by means of bearings 35. Levers 36 are fixed to the beams 33 so that they may be rocked to vary the angles of the teeth 34 with respect to the ground as may be desired.

Suitable beams 37 are associated with each lever 38 so as to hold the same in the desired adjusted position. It is thought that the construction, operation, and advantages of this invention will now be quite apparent to those skilled in this art without a more detailed description thereof.

In actual practice I have found this apparatus very efficient in eliminating weeds, morning glories and the like. The apparatus works to advantage with hard ground that cannot be sufficiently plowed with a disk.

The apparatus loosens the soil and maintains the ground level. The apparatus may be used at any depth desired.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A ground working apparatus of the class described comprising a wheeled arch, a U-shaped frame extending rigidly and forwardly from the ends of the arch to have its bight disposed forwardly, a plurality of beams, means for hingedly mounting the beams on said bight, a bar extending across the intermediate portion of the beams, other beams engaged on said bar and extending between the first mentioned beams, the rear ends of said beams extending downwardly, shovels, means for attaching the shovels to the rear ends of the beams, and means for raising and lowering the beams as a unit, arms pivotally engaged with some of the first mentioned beams and extending rearwardly therefrom, a bar connecting the rear end of the first mentioned beams over which said arms extend, a pair of spaced parallel transversely extending beams, means for rockably mounting the last mentioned beams on the arms, teeth projecting from the last mentioned beams, and means for rocking said last mentioned beams.

In testimony whereof I affix my signature.

AMOS C. KORITZ.